United States Patent
Sridhar et al.

(10) Patent No.: US 10,354,308 B2
(45) Date of Patent: Jul. 16, 2019

(54) DISTINGUISHING ACCESSORIES FROM PRODUCTS FOR RANKING SEARCH RESULTS

(71) Applicant: Google Inc., Mountain View, CA (US)

(72) Inventors: Srinath Sridhar, Pittsburgh, PA (US); Ashutosh Garg, Sunnyvale, CA (US); Kedar Dhamdhere, Sunnyvale, CA (US); Varun Kacholia, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 150 days.

(21) Appl. No.: 14/790,893

(22) Filed: Jul. 2, 2015

(65) Prior Publication Data

US 2015/0310528 A1  Oct. 29, 2015

Related U.S. Application Data

(63) Continuation of application No. 12/199,795, filed on Aug. 27, 2008, now abandoned.

(60) Provisional application No. 60/968,302, filed on Aug. 27, 2007.

(51) Int. Cl.
*G06F 16/338* (2019.01)
*G06Q 30/06* (2012.01)
*G06F 16/951* (2019.01)
*G06F 16/2457* (2019.01)

(52) U.S. Cl.
CPC ... *G06Q 30/0627* (2013.01); *G06F 16/24578* (2019.01); *G06F 16/338* (2019.01); *G06F 16/951* (2019.01); *G06Q 30/0601* (2013.01); *G06Q 30/0603* (2013.01)

(58) Field of Classification Search
USPC .................................................. 705/7.11–28
See application file for complete search history.

(56) References Cited

U.S. PATENT DOCUMENTS

| | | | |
|---|---|---|---|
| 6,539,353 B1 * | 3/2003 | Jiang | G10L 15/142 704/252 |
| 7,082,426 B2 * | 7/2006 | Musgrove | G06Q 20/04 |
| 8,271,484 B1 * | 9/2012 | Rajaraman | G06F 17/30477 705/26.81 |
| 2002/0042793 A1 * | 4/2002 | Choi | G06F 17/30687 |
| 2003/0088562 A1 * | 5/2003 | Dillon | G06F 17/3061 |

(Continued)

FOREIGN PATENT DOCUMENTS

| | | | |
|---|---|---|---|
| WO | WO2005010702 A3 | 5/2006 | |
| WO | 2009/029689 A1 | 3/2009 | |
| WO | WO2006113597 A3 | 6/2009 | |

OTHER PUBLICATIONS

An, "U.S. Office Action issued in copending U.S. Appl. No. 12/199,795, filed Aug. 27, 2008", dated Apr. 2, 2015, 12 pages.

(Continued)

*Primary Examiner* — Scott A Zare
(74) *Attorney, Agent, or Firm* — Johnson, Marcou & Isaacs, LLC

(57) ABSTRACT

Offer listings can be classified as accessory offers or product offers using a classification operation performed on a corpus of offers. Data from the classification operation can be used to classify received queries as either product or accessory, and to classify results as products or accessories for purposes of presenting a relevant list of results to a user.

18 Claims, 7 Drawing Sheets

(56) References Cited

U.S. PATENT DOCUMENTS

| | | | |
|---|---|---|---|
| 2003/0195877 A1* | 10/2003 | Ford | G06F 17/30705 |
| 2005/0004889 A1* | 1/2005 | Bailey | G06F 17/30864 |
| 2006/0041548 A1* | 2/2006 | Parsons | G06F 17/30873 |
| 2006/0161534 A1 | 7/2006 | Carson | |
| 2007/0061317 A1* | 3/2007 | Ramer | G06F 17/30864 |
| 2007/0168354 A1* | 7/2007 | Ramer | G06F 17/30749 |
| 2007/0185865 A1* | 8/2007 | Budzik | G06F 17/30389 |
| 2007/0282797 A1* | 12/2007 | Wang | G06F 17/30867 |
| 2007/0288431 A1* | 12/2007 | Reitter | G06F 17/2745 |
| 2008/0114721 A1* | 5/2008 | Jones | G06F 17/30672 |
| 2008/0249876 A1* | 10/2008 | Rice | G06Q 30/0212 705/14.14 |
| 2009/0076927 A1 | 3/2009 | Sridhar et al. | |
| 2010/0179956 A1* | 7/2010 | Jammalamadaka | G06F 17/30389 707/748 |
| 2011/0055195 A1* | 3/2011 | Reitter | G06F 17/2745 707/710 |

OTHER PUBLICATIONS

An, "U.S. Office Action issued in copending U.S. Appl. No. 12/199,795, filed Aug. 27, 2008", dated Apr. 18, 2013, 22 pages.
An, "U.S. Office Action issued in copending U.S. Appl. No. 12/199,795, filed Aug. 27, 2008", dated Aug. 27, 2013, 23 pages.
An, "U.S. Office Action issued in copending U.S. Appl. No. 12/199,795, filed Aug. 27, 2008", dated Jan. 17, 2012, 23 pages.
An, "U.S. Office Action issued in copending U.S. Appl. No. 12/199,795, filed Aug. 27, 2008", dated Aug. 27, 2012, 24 pages.
An, "U.S. Office Action issued in copending U.S. Appl. No. 12/199,795, filed Aug. 27, 2008", dated Jun. 9, 2011, 24 pages.
An, "U.S. Office Action issued in copending U.S. Appl. No. 12/199,795, filed Aug. 27, 2008", dated Feb. 7, 2014, 25 pages.
An, "U.S. Office Action issued in copending U.S. Appl. No. 12/199,795, filed Aug. 27, 2008", dated Sep. 9, 2014, 7 pages.
International Search Report and Written Opinion in International Application No. PCT/US2008/074529, dated Nov. 14, 2008, 14 pages.
PCT International Preliminary Report on Patentability and the Written Opinion, PCT/US2008/074529, dated Mar. 2, 2010, 14 pages.

* cited by examiner

500 ↘

| KEYWORD | | PRICE | — 502 |
|---|---|---|---|
| LAPTOP | 0 | 987.99 | — 504 |
| LAPTOP | 1 | 53.99 | |

↑
ACCESSORY

| KEYWORD | PRODUCT MEAN | PRODUCT STANDARD DEVIATION | ACCESSORY MEAN | ACCESSORY STANDARD DEVIATION |
|---|---|---|---|---|
| LAPTOP | 1025.68 | 302.44 | 32.67 | 7.92 |

FIG. 5B

DISTINGUISHING ACCESSORIES FROM PRODUCTS FOR RANKING SEARCH RESULTS

CROSS-REFERENCE TO RELATED APPLICATIONS

This application is a continuation application of, and claims priority to, U.S. patent application Ser. No. 12/199,795, filed on Aug. 27, 2008, which claims priority under 35 U.S.C. § 119(e) to U.S. Provisional Application Ser. No. 60/968,302, filed on Aug. 27, 2007. The disclosure of each of the foregoing application is incorporated herein by reference.

BACKGROUND

The present disclosure relates to ranking search results for presentation to a computer user.

Search engines provide users with a list of results identified from a set of candidate data. A query that includes one or more keywords related to information being sought is entered, and the system returns a set of results from which the user can choose. The identification of the results included in the results set can use any number of identification algorithms and criteria.

Search engines are often used by consumers to perform research regarding products of interest in order to make a purchasing decision. For example, a user may wish to obtain information regarding a product's price, features, or availability. The set of data from which a given system identifies results generally includes listings for products as well as a variety of accessories related to those products. An accessory is an item that is sold separate from a product but is associated with the product (for example, through its function, features, operation, appearance, etc.) such that the accessory might appear in search results for the product.

A user search for information regarding a given product often returns a set of results that includes both product and accessory listings. The product and accessory results can be intermingled in the order of the results presented to the user. This can prove frustrating. For example, if the user is researching a product to make a purchasing decision, the user is likely to be less interested in results related to a product accessory for a product that the user does not yet own. Unfortunately, in cases where the results set includes intermingled product and accessory result listings, the user may have to visually scan each individual result to determine if the result is of interest. To determine if a given result is a related to a product or accessory, the user may have to select the result, by clicking on it for example, to review it more thoroughly.

SUMMARY

This specification describes technologies relating to distinguishing accessories from products for ranking search results.

In general, one aspect of the subject matter described in this specification can be embodied in methods that include the actions of receiving a query, identifying a set of ranked results corresponding to the query from a corpus of offer data, classifying the query as a product query or an accessory query, generating a set of modified ranked results based on the classification of the query, generating the set of modified ranked results including, if the query is a product query, for each result in the set of ranked results, determining if the result is an accessory result, and if the result is an accessory result, demoting the rank of the result, and sending at least a subset of highest ranked results in the modified ranked results in response to the query.

Particular embodiments of the subject matter described in this specification can be implemented to realize one or more of the following advantages. The invention can provide a set of results more relevant to a user query. If a user query is indicative of a product search, for example, accessory results can be decreased in rank or omitted from the results presented to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A shows two example output records of an intermediate preprocessing step.

FIG. 5B shows an example price distribution output record.

Like reference numbers and designations in the various drawings indicate like elements.

DETAILED DESCRIPTION

Figure 1:
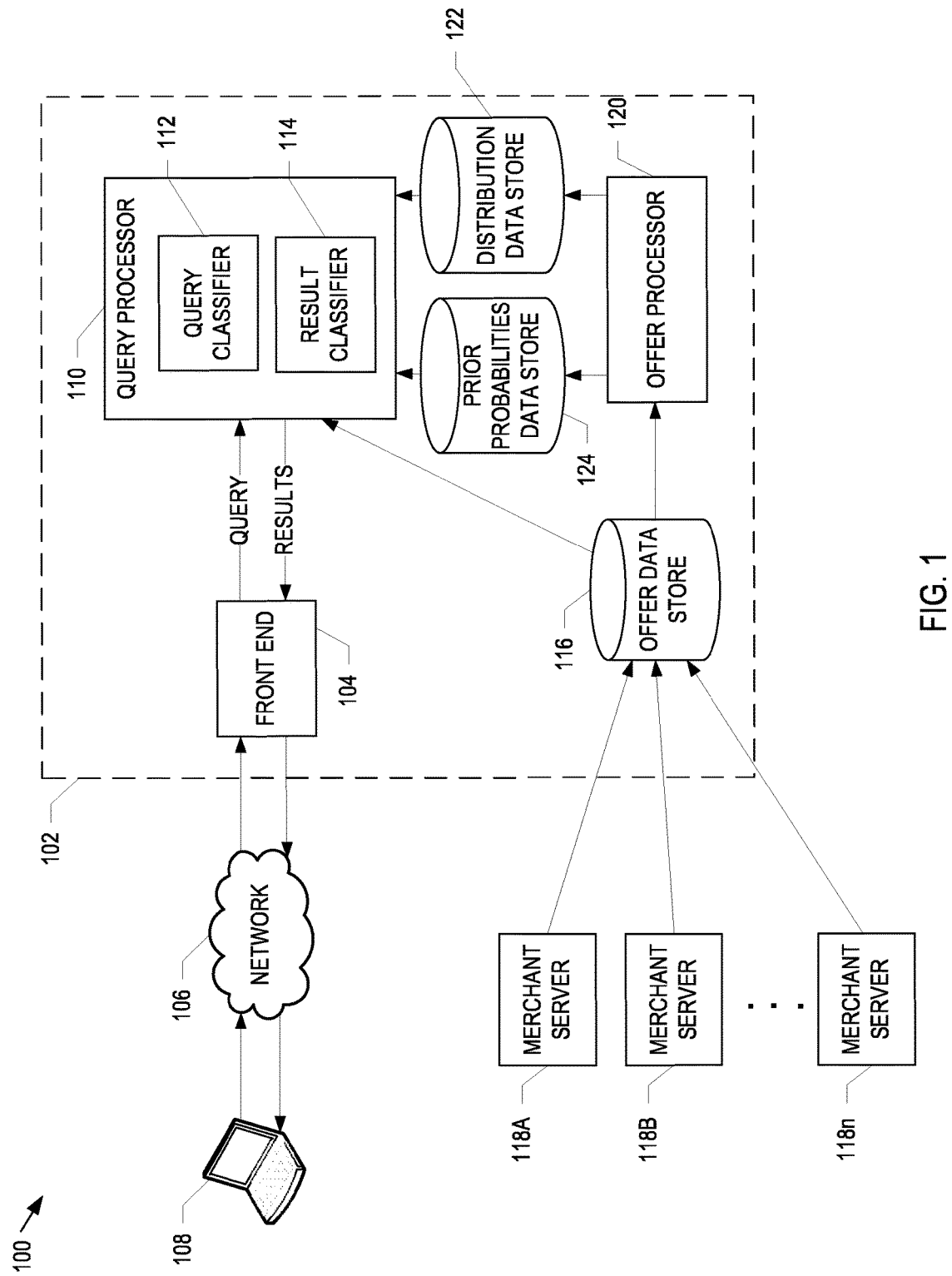
FIG. 1 is a block diagram of an example environment of an example search engine configured to distinguish accessories from products.

FIG. 1 is a block diagram of an example environment 100 of an example search engine 102 configured to distinguish accessories from products. The search engine 102 includes a front end server 104 that interfaces with the network 106. The front end server 104 can be, for example, a web server that communicates with one or more client computers over the Internet. The front end server 104 can, for example, provide hypertext markup language formatted web pages to a web browser of the computer 108. A web browser running on the computer 108 can interpret these web pages for display on the computer 108. The displayed web pages can function as a user interface of the search engine 102.

The front end server 104 can accept a query from the client computer 108 that includes one or more keywords. The query can be passed on to the query processor 110 for processing. The query processor 110 can identify one or more results corresponding to the query and return the results to the front end server 104 for transmission to the client computer 108. Individual results in a set of results can be ordered according to a ranking score computed by the query processor 110. A result set can be delivered to the client computer 108 as a complete set of results or delivered in segments. For example, the 10 highest ranked results can be delivered first in one web page that includes a link that can be selected by a user to cause the front end server 104 to deliver the next 10 highest ranked results.

The offer data store 116 includes offer records corresponding to items offered for sale by one or more merchants. The merchants can, for example, register with the search engine 102 to upload offer records to the offer data store 116. Alternatively, or in addition, the search engine 102 can retrieve offer records from merchant servers, through, for example, downloading a file including the offer records from merchants, and/or using a network crawling application.

The search engine 102 can search a corpus of offer data, for example, search the data store 116 to identify one or more query results from the offer records. In some implementations, the search engine can identify query results from both offer records in the data store 116 and an index of documents available on the network 106 that is created and updated by periodically searching the network 106. In some implementations, a user of the computer 108 can indicate, using the user interface provided by the front end server 104, that only items for sale should be included in the returned results. In such a case the search engine 102 can return results found in the offer data store 116 without searching the document index.

Merchants registered with the search engine 102 can upload offer records to the offer data store 116 from one or more merchant servers 118A, 118B, ... 118n. For example, the merchant servers can upload offer records corresponding to items offered on an online store operated by the merchant. The offer records can include multiple fields such as, for example, a title of the offer, a description of the item for sale, a price at which the item is offered for sale, and/or a category of the offer. The category field can include a category name and/or identifier from a list of categories designated by the search engine provider and provided to merchants. For instance, the list of categories can be provided to registered merchants, and the merchants can be instructed to categorize offer records by selecting one or more categories from the category list.

An offer processor 120 of the search engine can perform preprocessing operations using offer records from the offer data store 116 to generate distribution data stored in the distribution data store 122 and prior probabilities data stored in the prior probabilities data store 124. The prior probabilities data in the data store 124 can be used, for example, by the query classifier 112 and/or the result classifier 114, as described in more detail below, to compare query keywords and keywords from identified results to offer record keywords that have a calculated probability of being associated with an accessory.

The query processor 110 can use this comparison to distinguish between accessory related results and product related results in the set of search results. The query processor 110, as further described below, can use offer records from the offer data store 116, data from the distribution data store 122, and/or data from the prior probabilities data store 124 to distinguish accessory related results from product related results. In some implementations, the query processor assigns lower ranking scores to accessory results than to product results so that product results appear higher in a ranked list of search results than accessory results.

Figure 2A:
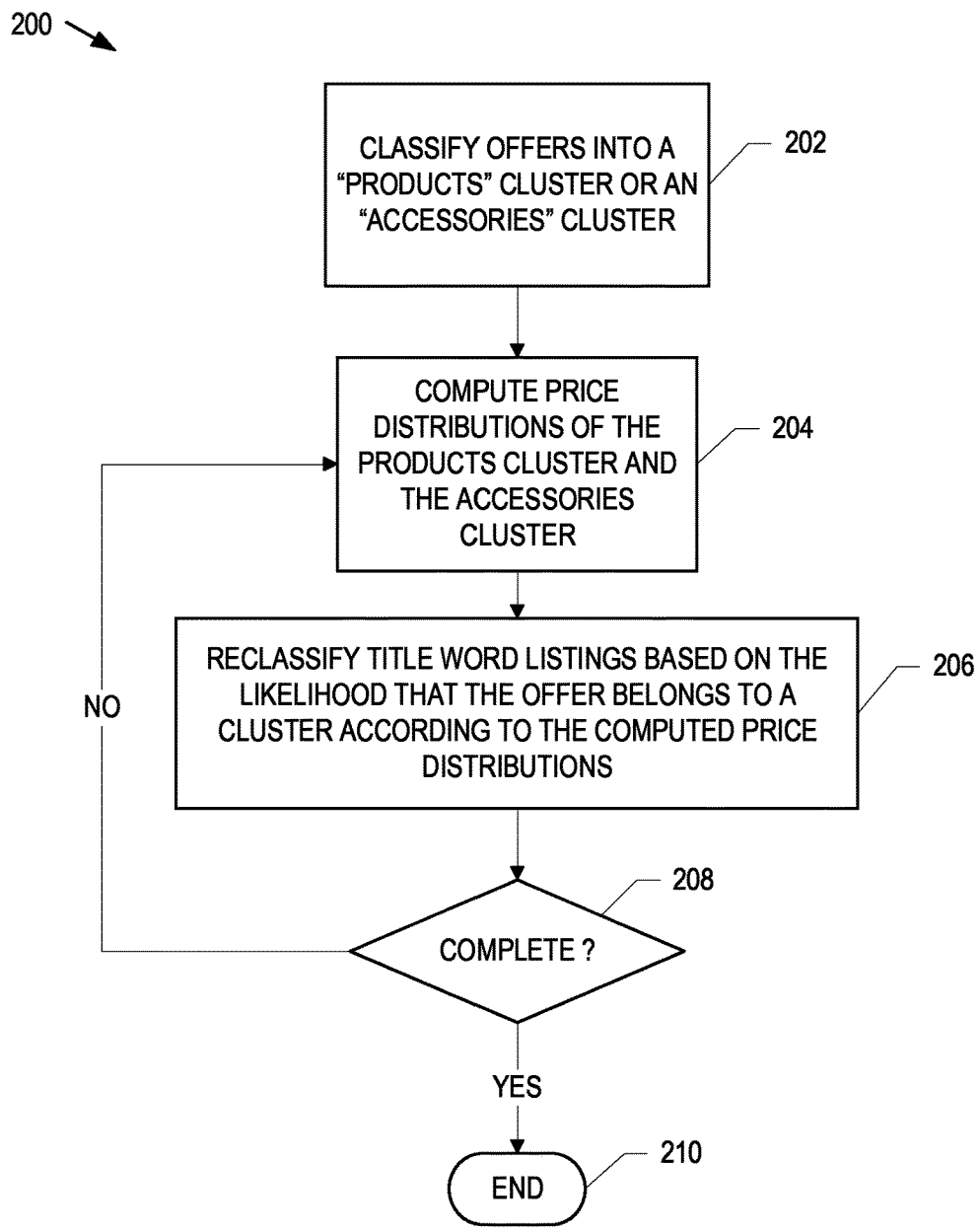
FIG. 2A is a flowchart of an example method for generating distribution data from offer records.

FIG. 2A is a flowchart of an example method 200 for generating distribution data from offer records. The offer processor 120 can, for example, perform the method 200 using offer records stored in the offer data store 116 to generate the distribution data that is stored in the distribution data store 122. The offer records are classified into either a "product" cluster or an "accessory" cluster (202). For example, offer records can be heuristically classified based on information in one or more fields of an offer record.

In some implementations, only a subset of the offer records is classified as products or accessories. The subset can be selected based on the category field of the offer record. For instance, offer records belonging to categories that are known to include products that often have corresponding accessories can be classified, but not offer records that belong to other categories. Example categories that often have products with corresponding accessories include categories related to computers, video games, and electronics in general.

In some implementations, the offer processor 120 can heuristically classify a given offer by reading a title field of the offer to determine if the title includes words that are often associated with accessories. In some implementations, the classification can be based on the prior probabilities data in the data store 124. In some implementations, and/or in situations where no prior probabilities data is available (for example, the offer records are new and no prior probabilities data has yet been generated) the title field can be compared to a blacklist that includes words that are known to often be associated with accessories such as, e.g., "accessory", "case", "cartridge", etc.

In some implementations, the offer processor 120 can also read the category field of the offer record to determine if the offer is a product or an accessory. If the corresponding category is, for example, specifically a category for accessories, the offer can be classified as an accessory. In some implementations, the output of the offer processor 120, upon the offer processor 120 completing a heuristic classification step, can be a classification output in a format including one line for each offer title word (for example, see the format shown in FIG. 5A). Offer title words can include, for example, significant words that are included in the title field of the offer records in the offer data store 116 omitting short words and stemming prefixes and/or suffixes from root words. A given offer record can include more than one title word in its title field such that multiple lines of the classification output format can correspond to a single offer record. The classification output format can also include the price of the offer record associated with the offer title word and an indication as to the heuristic classification (as product or accessory) of the offer record. For example, the classification indication can be a logical yes or no as to whether the offer record was classified as an accessory.

Following the heuristic classification, a price distribution of the offers placed in the products cluster and the offers placed in the accessories cluster is computed (204). Price distribution data can be stored in the distribution data store 122. The price distribution can be computed using, for example, the output of the classification step. For each unique title word in each cluster of the classification output, central tendency pricing data, such as a mean and standard deviation of the prices for that title word, can be computed. For example, the mean value and a standard deviation of the value in the price field for lines in the classification output that have a title word of "laptop" and a classification of "product" are computed. The mean and standard deviation of prices for lines having the title word "laptop" that are classified as "accessory" are also computed. In some implementations, the format of the generated price distribution data is a title word followed by the mean and standard deviation of prices of the product cluster, and the mean and standard deviation of prices of the accessory cluster (for example see the format shown in FIG. 5B).

Title word listings extracted from the offer records are then reclassified based on the likelihood that the corresponding offer is a product offer or an accessory offer according to the price distribution data (206). The likelihood calculation can assume equal prior probabilities and a single Gaussian distribution for each corresponding accessory and product offer. For example, a title keyword "laptop" extracted from an offer record having a price of "53.99" can be compared to the price distribution data 506 shown in FIG. 5B for offers including the keyword "laptop". The offer from which the keyword in row 504 corresponds can be classified as an accessory since, given the price distribution 506, it is more likely that the corresponding offer is for an accessory than a product.

Depending on iteration criteria, a check is performed to determine if the classification process is complete (208). The iteration criteria can be, for example, a number of title word listings that were reclassified based on the likelihood calculation. For instance, if this number is above a certain threshold, the process can return to 204 to recompute the price distributions using the reclassified clusters. Otherwise the process ends (210).

Distributions other than a price distribution can also be used to classify offers. For example, offers can be classified according to title unigram distribution and title word pairs distribution.

Figure 2B:
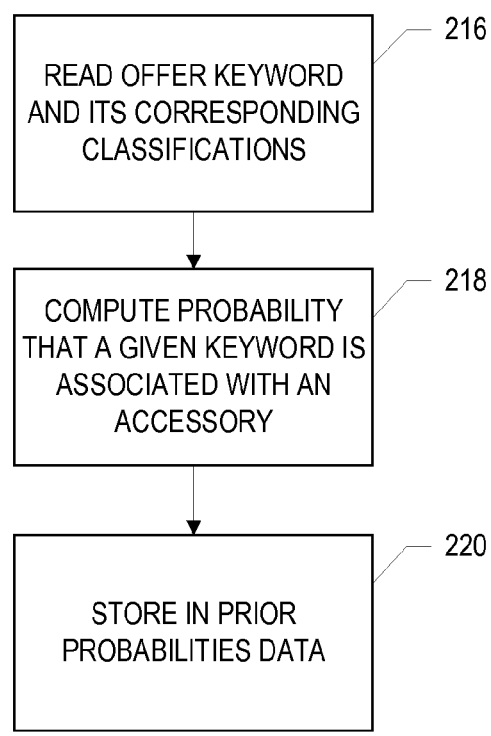
FIG. 2B is a flowchart of an example method for generating prior probabilities data from offer records.

FIG. 2B is a flowchart of an example method for generating prior probabilities data from offer records. An offer keyword is read along with its corresponding classifications (216). For instance, the output of the classification process can be read (for example, see the format shown in FIG. 5A). For a given keyword (e.g. "cartridge") the number of times the keyword is found to be associated with an accessory and the number of times the keyword is found to be associated with a product can be counted and used to compute a probability that the keyword is associated with an accessory (218). The computed probability can be stored with the keyword in the prior probabilities data (220). Prior probabilities data in the datastore 124 can be used, for example, by the query classifier 112 to classify a query as described below.

Figure 3A:
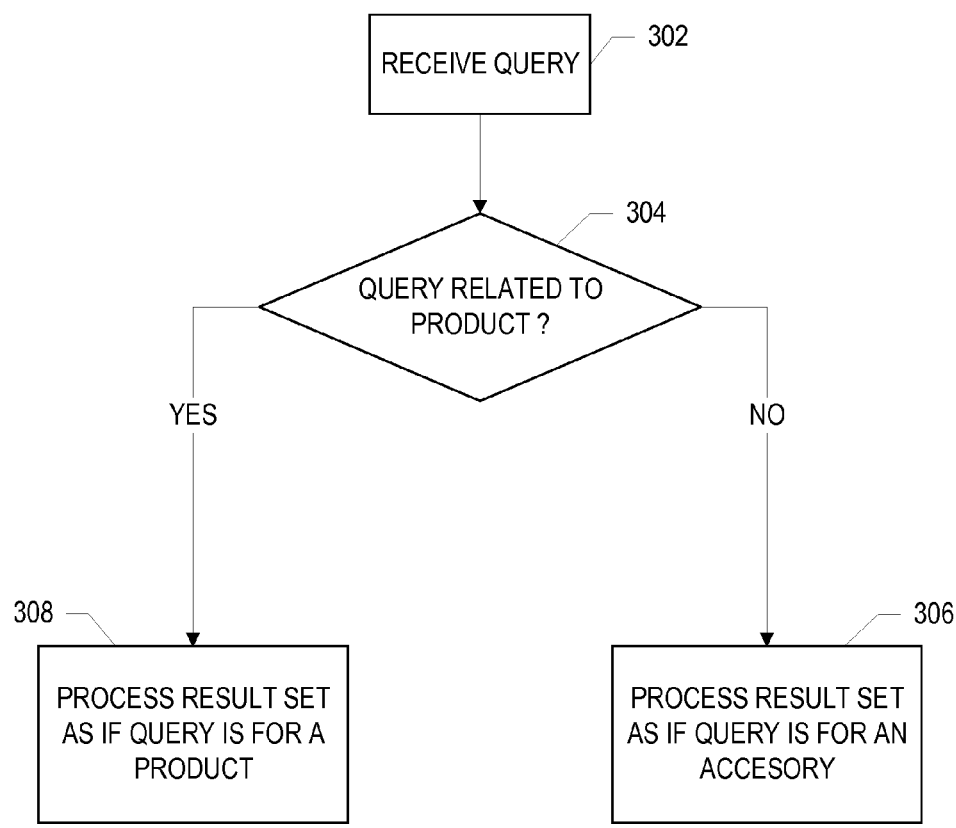
FIG. 3A is a flowchart of an example method for processing results returned by a query.

FIG. 3A is a flowchart of an example method 300 for processing results returned by a query. A query is received (302). A determination is made as to whether the query is related to a product (304). If the query is found to not be related to a product, results of the query are processed as if the query is for an accessory (306). If the query is found to be related to a product, the results of the query are processed as if the query is for a product (308).

In some implementations, the method 300 is performed by the query classifier 112 of the query processor 110. The determination as to whether a given query relates to a product can include, for example, comparing query keywords to words in the prior probabilities data in the datastore 124. In some implementations, the prior probabilities data includes a blacklist that includes words that have been found to have a high probability of being associated with accessories. Such a blacklist could include, for example, words such as "accessory", "case", and "cartridge".

The determination can also include retrieving a set of results for the query and checking the category field of any offer record corresponding to a given result. If a threshold number of results in the results set correspond to offer records that belong to product related categories, the query can be determined to be a product query. In some implementations, the query classifier 112 can accept an input parameter that identifies a file that includes a list of product related categories.

The determination can also include checking a classification of offer records corresponding to results in the result set to determine if a large number of the offer records are classified as accessories. For example, if more than a threshold number of offer records corresponding to the results in the result set are classified as accessories, then the query can be determined to be an accessory query (and not a product query).

Figure 3B:
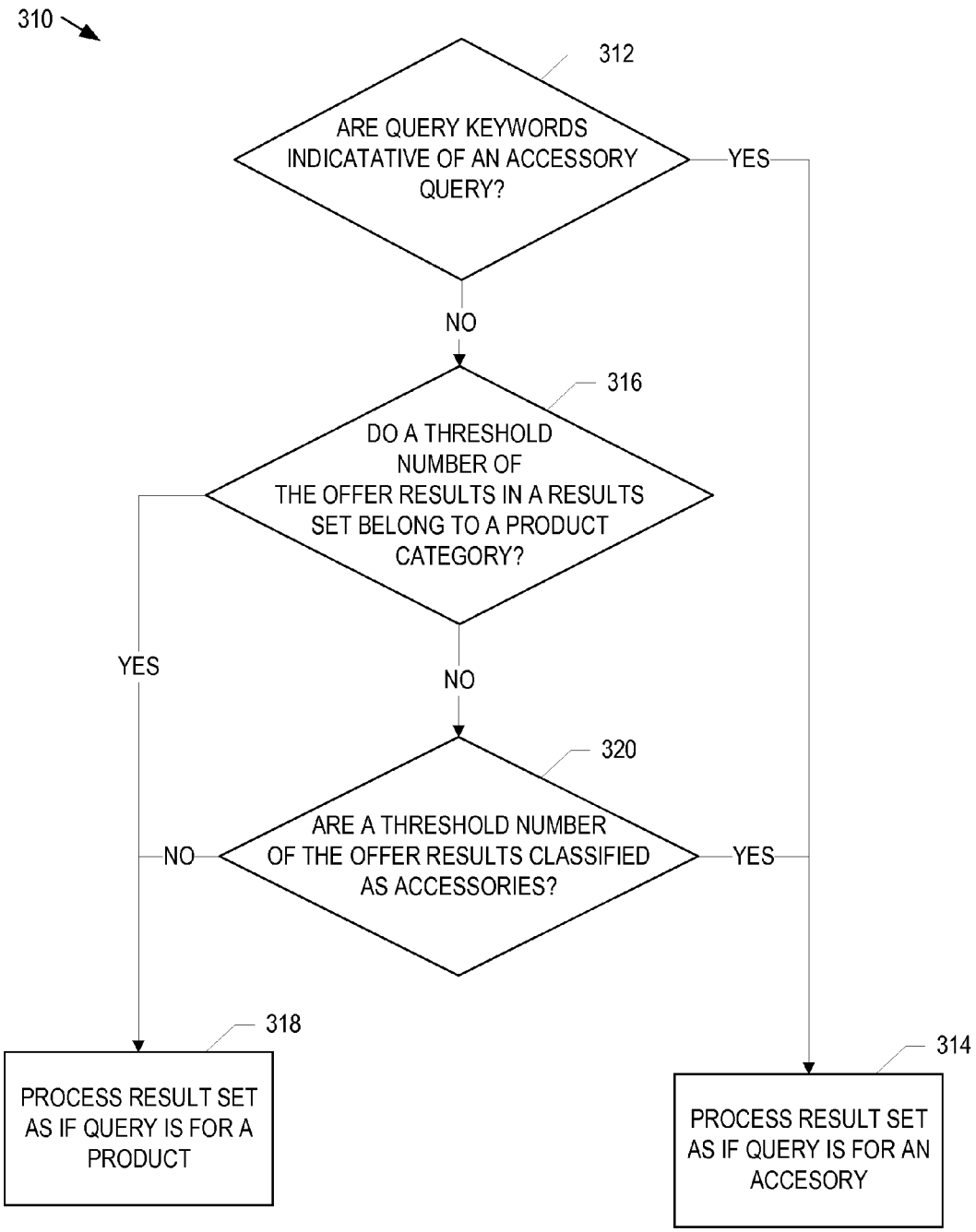
FIG. 3B is a flowchart of an example method for determining if a query should be processed as a product query.

FIG. 3B is a flowchart of an example method 310 for determining if a query should be processed as a product query. In some implementations the method 310 is performed by the query classifier 112 of the query processor 110. The query keywords of a received query are analyzed to determine if they are indicative of an accessory query. For example, the query keywords can be compared to the prior probabilities data (312). If a probability calculation based on one or more query keywords and the prior probabilities data indicates that the query is an accessory query, a result set of the query is processed as if the query is for an accessory (314).

If the query is not found to be an accessory query, the number of results belonging to a product related category is compared to a threshold number (316). In some implementations, the query classifier 112 can accept an input parameter that identifies a file that includes a list of product related categories. The query classifier can also accept the threshold number as an input. For example, the threshold number and product related categories file can be given as command line inputs to a query classifier 112 executable file. If the threshold number of results belonging to product related categories is found, a result set of the query is processed as if the query is for a product (318). For example, if a set of results includes 200 results, the threshold number used can be 10. In this case, if there are 10 or more product related results in the set of 200 results, the query is classified as a product query.

If the threshold number of results belonging to product related categories is not met, the number of results in the result set that are classified as accessory offers is compared to a second threshold number (320). This threshold number can be provided as a command line input parameter as well. If the threshold number of results classified as accessories is met, the result set is processed as if the query is for an accessory (314). If the threshold number of results classified as accessories is not met, the result set is processed as if the query is for a product (314). For example, if a set of results includes 200 results, 195 can be used as the second threshold number. In this case, if 195 of the 200 results are accessory related results, the query is classified as an accessory query.

In some implementations, a result set processed as if the query is for an accessory is processed normally without any modification to a ranking of the results in the results set based on the offers' classification as a product or accessory.

Figure 4:
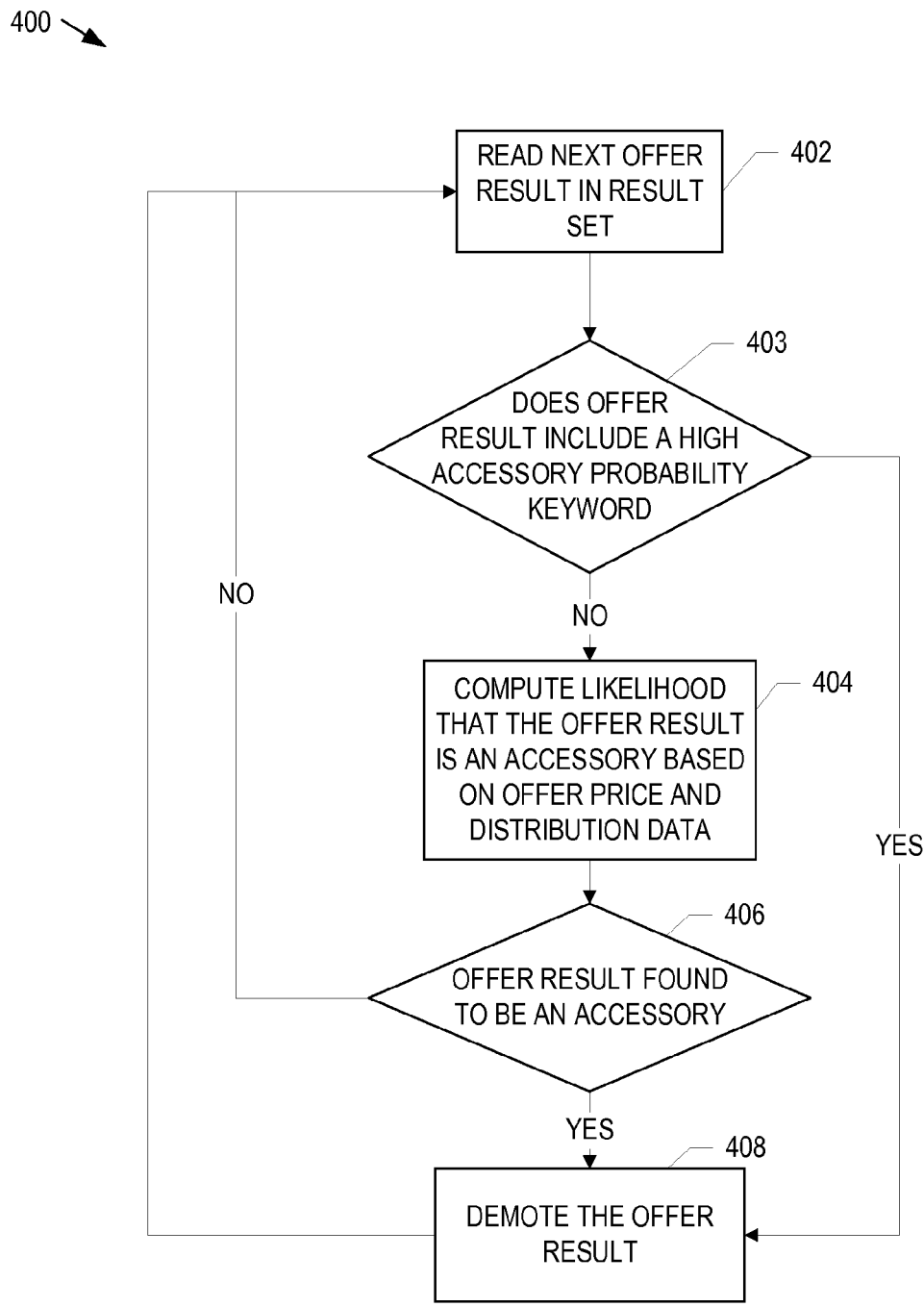
FIG. 4 is a flowchart of an example method for processing a result set for a product query.

FIG. 4 is a flowchart of an example method 400 for processing a result set for a product query. In some implementations, the method 400 is performed by the result classifier 114 of the query processor 110. An offer result in the query results set is read (402). Words found in the offer result are compared to the prior probabilities data stored, for example, in the prior probabilities data store 124. If a comparison of the prior probabilities data and the keywords included in the offer indicates that the offer result is an accessory, the offer result is demoted (408). In some implementations, the prior probabilities data includes a blacklist that includes words known to be associated with accessories. If an offer result includes a blacklisted word (for example, in its title, and/or in its description) the offer result is demoted.

If comparison of the prior probabilities data with the offer result does not indicate that the offer result in an accessory offer, the likelihood that the offer result is an accessory based on the corresponding price of the offer result and the distribution data is computed (404). In some implementations, computing the likelihood that the offer result is an accessory includes computing a likelihood ratio of products and accessories according to the following:

$$P_{TOTAL} = \log(Pr[price|keyword_1, accessory]) - \log(Pr[price|keyword_1, product]) + \log(Pr[price|keyword_2, accessory]) - \log(Pr[price|keyword_2, product]) \ldots \log(Pr[price|keyword_n, accessory]) - \log(Pr[price|keyword_n, product])$$

Where the query includes the keywords:
$keyword_1$ $keyword_2$ ... $keyword_n$,
and
$Pr[price|keyword_n, product]$
is the probability that a given offer result is a product offer based on the offer result's price and the product mean and product standard deviation of the $n^{th}$ keyword in the query, and
$Pr[price|keyword_n, accessory]$
is the probability that a given offer result is an accessory offer based on the offer result's price and the accessory mean and accessory standard deviation of the $n^{th}$ keyword in the query.

If the computed value of $P_{TOTAL}$ is greater than a threshold value (1 for example), the offer result is classified as an accessory, and otherwise it is classified as a product. The probabilities $Pr[price|keyword_n, product]$ can be computed by assuming a Gaussian distribution using the parameters from the distribution data stored, for example in the data store 122 (i.e. the output of the process 200 described with respect to FIG. 2).

If the offer result is not found to be an accessory, the offer result is not demoted, and the next offer result in the result set is read (402). If the offer result is found to be an accessory, the offer result is demoted (408). In some implementations, the results in the result set include an initial ranking. If the offer result is found to be an accessory, the offer result is demoted by decreasing this initial ranking. Demotion of accessory results lowers the ranking of these results to move them down the ranked list of the results set. Product results are not demoted so that product results appear earlier in the ranked list than accessory results.

Although the above disclosure describes demoting accessory results of a query classified as a product query to move these results lower in a list of ranked results, product results can, alternatively, be promoted to move product results higher in a list of ranked results. For example, an initial rank of product results for a product query can be increased in rank by a constant amount to move these results toward the top of a list of ranked results.

In some implementations, if a query is determined to be an accessory query, rather than a product query as described above, by the query classifier 112, the result classifier 114 of the query processor 110 can demote any results determined to be product results or, alternatively, promote accessory results.

FIG. 5A shows example output records 500 of an intermediate preprocessing step. The records include a keyword field, a Boolean field that indicates whether the corresponding offer is classified as an accessory or not, and a price field. Example record 502 is classified as a product, and example record 504 is classified as an accessory. These records can be output, for example, by the heuristic classification and/or the reclassification operations of the method 200.

FIG. 5B shows an example price distribution output record 506. The example record 506 includes a keyword field followed by four floating point numbers. These numbers correspond to, in order: the mean price of offer records classified as products that include the indicated keyword in their titles, the standard deviation of offer records classified as products that include the indicated keyword in their titles, the mean price of offer records classified as accessories that include the indicated keyword in their titles, and the standard deviation of offer records classified as accessories that include the indicated keyword in their titles.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method to classify search query results to lower the rankings of ancillary results, comprising:

receiving, by an online search engine including at least one server and at least one data storage device, a search query submitted to the search engine from a user computing device;

identifying, by the search engine and using the received search query, ranked search results that include first results of a first type and second results of a second type, wherein a first particular result of the first type has an initial rank position in the ranked results, and a second particular result of the second type has an initial rank position in the ranked results, wherein identifying the ranked results comprises identifying product results as the first results of the first type and accessory results as the second results of the second type;

determining, by the search engine, a first likelihood that each of one or more of the ranked results is the first type of result based on an attribute of the ranked search result and an attribute distribution for items of the first type that are responsive to the query;

determining, by the search engine, a second likelihood that each of one or more of the ranked results is the second type of result based on the attribute of the ranked search result and an attribute distribution for items of the second type that are responsive to the query;

determining, by the search engine, based on the first likelihood and the second likelihood for each of the ranked results, a first number of first results that are included in the ranked results and a second number of second results that are included in the ranked results;

classifying, by the search engine, the query as a query requesting results of the first type based, at least in part, on the first number of first results exceeding the second number of second results;

re-ranking, by the search engine, the ranked results based on the classification of the query by lowering the rank position of the second particular result relative to the initial rank position of the second particular result and by raising the rank position of the first particular result relative to the initial rank position of the first particular result; and providing, by the search engine, to the user device and in response to the query, a search results page that presents search results specifying at least a subset of highest ranked results in the re-ranked results.

2. The method of claim 1, wherein identification of accessory results comprises:

comparing keywords of the at least one ranked result to an accessory keyword list; and classifying the at least one ranked result as an accessory result in response to one or more keywords of the result matching a term in the accessory keyword list by determining a likelihood score based on query keywords and keyword price distribution data for the query keywords, the keyword price distribution data being determined from a corpus of offer data and specifying a product price distribution for offers responsive to the query keywords that are considered product offers.

3. The method of claim 2, wherein the likelihood score is a log likelihood ratio score of product prices and accessory prices.

4. The method of claim 3, wherein the likelihood ratio score is determined according to:

$$P_{TOTAL}=\log(Pr[price|keyword_1,accessory])-\log(Pr[price|keyword_1,product])+\log(Pr[price|keyword_2,accessory])-\log(Pr[price|keyword_2,product])\ldots\log(Pr[price|keyword_n,accessory])-\log(Pr[price|keyword_n,product]),$$ wherein:

$keyword_1$, $keyword_2$, through $keyword_n$, are the query keywords;

Pr [price|$keyword_n$, product] is a probability that a given result is a product result based on a result price and a product price mean and product price standard deviation of an $n^{th}$ keyword in the query;

Pr [price|$keyword_n$, accessory] is a probability that a given result is an accessory result based on the result price and an accessory price mean and an accessory price standard deviation of the $n^{th}$ keyword in the query; and the result is determined to be an accessory result if $P_{TOTAL}$ is greater than a threshold score.

5. The method of claim 2, further comprising:
determining the keyword price distribution data from the corpus of offer data.

6. The method of claim 5, wherein determining the keyword price distribution data from the corpus of offer data comprises:
classifying first offers in the corpus of offer data as product offers and second offers in the corpus of offer data as accessory offers, the product offers and the accessory offers each having offer keywords;
determining a product price mean and a product price standard deviation for offer keywords of the product offers; and
determining an accessory price mean and an accessory price standard deviation for offer keywords of the accessory offers.

7. The method of claim 5, wherein determining the keyword price distribution data from the corpus of offer data comprises:
heuristically classifying offers in the corpus of offer data as product offers and accessory offers;
determining price distributions for offer keywords corresponding to offers classified as accessory offers;
determining price distributions for offer keywords corresponding to offers classified as product offers; and
reclassifying the offers based on a determined likelihood that a given offer is a product offer or an accessory offer according to the price of the offer and the determined price distributions.

8. The method of claim 7, wherein determining the keyword price distribution data from the corpus of offer data further comprises:
until a number of reclassified offers is below a threshold number:

determining price distributions for offer keywords corresponding to offers classified as accessory offers;
determining price distributions for offer keywords corresponding to offers classified as product offers; and
reclassifying the offers based on a determined likelihood that a given offer is a product offer or an accessory offer according to the price of the offer and the determined price distributions.

9. The method of claim 7, wherein the price distributions are Gaussian distributions.

10. A system to classify search query results to lower the rankings of ancillary results, comprising:
a search engine including at least one server; and
machine readable instructions stored on a computer readable medium, wherein execution of the instructions causes the search engine to perform operations comprising:
receiving a search query that was submitted to the search engine from a user device;
identifying, using the received search query, ranked search results that include first results of a first type and second results of a second type, wherein a particular result of the second type has an initial rank position in the ranked results, and wherein identifying the ranked results comprises identifying product results as the first results of the first type and accessory results as the second results of the second type;
determining a first likelihood that each of one or more of the ranked results is the first type of result based on an attribute of the ranked search result and an attribute distribution for items of the first type that are responsive to the query;
determining a second likelihood that each of one or more of the ranked results is the second type of result based on the attribute of the ranked search result and an attribute distribution for items of the second type that are responsive to the query;
determining, based on the first likelihood and the second likelihood for each of the ranked results, a first number of first results that are included in the ranked results and a second number of second results that are included in the ranked results;
classifying the query as a query requesting results of the first type based, at least in part, on the first number of first results exceeding the second number of second results;
re-ranking the ranked results based on the classification of the query by lowering the rank position of the particular result relative to the initial rank position of the particular result; and
providing, to the user device and in response to the query, a search results page that presents search results specifying at least a subset of highest ranked results in the re-ranked results.

11. The system of claim 10, wherein identification of accessory results comprises:
comparing keywords of the at least one ranked result to an accessory keyword list; and
classifying the at least one ranked result as an accessory result in response to one or more keywords of the result matching a term in the accessory list by determining a likelihood score based on query keywords and keyword price distribution data for the query keywords, the keyword price distribution data being determined from a corpus of offer data and specifying a product price distribution for offers responsive to the query keywords that are considered product offers.

12. The system of claim 11, wherein the likelihood score is a log likelihood ratio score of product prices and accessory prices.

13. The system of claim 12, wherein the likelihood ratio score is determined according to:

$$P_{TOTAL}=\log(Pr[price|keyword_1,accessory])-\log(Pr[price|keyword_1,product])+\log(Pr[price|keyword_2,accessory])-\log(Pr[price|keyword_2,product]) \ldots \log(Pr[price|keyword_n,accessory])-\log(Pr[price|keyword_n,product]), \text{ wherein:}$$

keyword$_1$, keyword$_2$, through keyword$_n$, are the query keywords;

Pr [price|keyword$_n$, product] is a probability that a given result is a product result based on a result price and a product price mean and product price standard deviation of an n$^{th}$ keyword in the query;

Pr [price|keyword$_n$, accessory] is a probability that a given result is an accessory result based on the result price and an accessory price mean and an accessory price standard deviation of the n$^{th}$ keyword in the query; and the result is determined to be an accessory result if $P_{TOTAL}$ is greater than a threshold score.

14. The system of claim 11, wherein the instructions cause performance of operations further comprising:
determining the keyword price distribution data from the corpus of offer data.

15. The system of claim 14, wherein determining the keyword price distribution data from the corpus of offer data comprises:
classifying first offers in the corpus of offer data as product offers and second offers in the corpus of offer data as accessory offers, the product offers and the accessory offers each having offer keywords;
determining a product price mean and a product price standard deviation for offer keywords of the product offers; and
determining an accessory price mean and an accessory price standard deviation for offer keywords of the accessory offers.

16. The system of claim 14, wherein determining the keyword price distribution data from the corpus of offer data comprises:
heuristically classifying offers in the corpus of offer data as product offers and accessory offers;
determining price distributions for offer keywords corresponding to offers classified as accessory offers;
determining price distributions for offer keywords corresponding to offers classified as product offers; and
reclassifying the offers based on a determined likelihood that a given offer is a product offer or an accessory offer according to the price of the offer and the determined price distributions.

17. The system of claim 16, wherein determining the keyword price distribution data from the corpus of offer data further comprises:
until a number of reclassified offers is below a threshold number:
determining price distributions for offer keywords corresponding to offers classified as accessory offers;
determining price distributions for offer keywords corresponding to offers classified as product offers; and
reclassifying the offers based on a determined likelihood that a given offer is a product offer or an accessory offer according to the price of the offer and the determined price distributions.

18. The system of claim 16, wherein the price distributions are Gaussian distributions.

* * * * *